(12) United States Patent
Yamashita et al.

(10) Patent No.: US 11,552,298 B2
(45) Date of Patent: Jan. 10, 2023

(54) ELECTRODE FOR LITHIUM-ION SECONDARY BATTERY

(71) Applicants: NATIONAL INSTITUTE OF ADVANCED INDUSTRIAL SCIENCE AND TECHNOLOGY, Tokyo (JP); SUMITOMO RUBBER INDUSTRIES, LTD., Kobe (JP)

(72) Inventors: Naoto Yamashita, Ikeda (JP); Takashi Mukai, Ikeda (JP); Masahiro Yanagida, Ikeda (JP); Tatsuya Kubo, Kobe (JP); Fumiya Chujo, Kobe (JP)

(73) Assignees: NATIONAL INSTITUTE OF ADVANCED INDUSTRIAL SCIENCE AND TECHNOLOGY, Tokyo (JP); SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 16/157,621

(22) Filed: Oct. 11, 2018

(65) Prior Publication Data

US 2019/0148734 A1 May 16, 2019

(30) Foreign Application Priority Data

Nov. 10, 2017 (JP) .............................. JP2017-217682

(51) Int. Cl.
*H01M 4/04* (2006.01)
*H01M 4/62* (2006.01)
(Continued)

(52) U.S. Cl.
CPC ......... *H01M 4/628* (2013.01); *H01M 4/0404* (2013.01); *H01M 4/13* (2013.01);
(Continued)

(58) Field of Classification Search
CPC ...... H01M 4/628; H01M 4/663; H01M 4/139; H01M 10/052; H01M 4/667; H01M 4/668;
(Continued)

(56) References Cited

U.S. PATENT DOCUMENTS 5,478,676 A   12/1995  Turi et al.
6,544,688 B1   4/2003  Cheng
(Continued)

FOREIGN PATENT DOCUMENTS

CN   103633285 A   3/2014
CN   104704662 A   6/2015
(Continued)

OTHER PUBLICATIONS

Extended European Search Report, dated Dec. 20, 2018, for European Application No. 18201309.4.
(Continued)

*Primary Examiner* — Anca Eoff
*Assistant Examiner* — Jenna Shulman
(74) *Attorney, Agent, or Firm* — Birch, Stewart, Kolasch & Birch, LLP (57) ABSTRACT

An object of the present invention is to provide a lithium-ion secondary battery having a large charge and discharge capacity and excellent cycle characteristics irrespective of kind and shape of a current collector. The lithium-ion secondary battery comprises an electrode comprising a primer layer for protecting a current collector and a crosslinking agent layer comprising a compound being capable of crosslinking an aqueous binder contained in the primer layer, the both layers being disposed between a current collector and an active material layer comprising a sulfur-based active material.

12 Claims, 3 Drawing Sheets

(51) Int. Cl.
*H01M 4/137* (2010.01)
*H01M 4/1399* (2010.01)
*H01M 4/60* (2006.01)
*H01M 4/36* (2006.01)
*H01M 4/66* (2006.01)
*H01M 10/0525* (2010.01)
*H01M 10/052* (2010.01)
*H01M 4/38* (2006.01)
*H01M 4/13* (2010.01)
*H01M 4/02* (2006.01)
*H01M 4/136* (2010.01)
*H01M 4/1397* (2010.01)
*H01M 4/58* (2010.01)

(52) U.S. Cl.
CPC ......... *H01M 4/137* (2013.01); *H01M 4/1399* (2013.01); *H01M 4/366* (2013.01); *H01M 4/38* (2013.01); *H01M 4/608* (2013.01); *H01M 4/622* (2013.01); *H01M 4/625* (2013.01); *H01M 4/661* (2013.01); *H01M 4/663* (2013.01); *H01M 4/667* (2013.01); *H01M 4/668* (2013.01); *H01M 10/052* (2013.01); *H01M 10/0525* (2013.01); *H01M 4/136* (2013.01); *H01M 4/1397* (2013.01); *H01M 4/5815* (2013.01); *H01M 2004/028* (2013.01)

(58) Field of Classification Search
CPC .......... H01M 4/38; H01M 4/13; H01M 4/137; H01M 4/1399; H01M 4/608; H01M 4/366; H01M 4/625; H01M 4/661; H01M 4/0404; H01M 10/0525; H01M 4/622; H01M 4/136; H01M 4/1397; H01M 4/5815; H01M 2004/028
See application file for complete search history.

(56) References Cited

U.S. PATENT DOCUMENTS

| 2001/0033971 | A1  | 10/2001 | Zhao et al.           |
|--------------|-----|---------|-----------------------|
| 2010/0291442 | A1  | 11/2010 | Wang et al.           |
| 2015/0280237 | A1* | 10/2015 | Mukai ......... C08F 218/08 |
|              |     |         | 252/506               |
| 2016/0293955 | A1  | 10/2016 | Hochi et al.          |
| 2017/0077501 | A1  | 3/2017  | Nishiura et al.       |
| 2020/0083507 | A1* | 3/2020  | Kaye ......... H01M 10/28 |

FOREIGN PATENT DOCUMENTS

| CN | 105556714 A      | 5/2016 |
| CN | 105960724 A      | 9/2016 |
| EP | 2922124 A1       | 9/2015 |
| JP | 2002-154815 A    | 5/2002 |
| JP | 2011-501383 A    | 1/2011 |
| JP | 2011-028948 A    | 2/2011 |
| JP | 2015-8147 A      | 1/2015 |
| JP | 5660539 B2       | 1/2015 |
| JP | 2015-092449 A    | 5/2015 |
| JP | 6132102 B2       | 5/2017 |
| WO | WO 2009/054987 A1 | 4/2009 |
| WO | WO 2015/050086 A1 | 4/2015 |

OTHER PUBLICATIONS

Japanese Office Action for Japanese Application No. 2017-217682, dated Aug. 31, 2021, with an English translation.
Chinese Office Action and Search Report dated Oct. 9, 2022 for Application No. 201811251478.6 with an English translation.

\* cited by examiner

ELECTRODE FOR LITHIUM-ION SECONDARY BATTERY

TECHNICAL FIELD

The present invention relates to an electrode comprising a sulfur-based active material, a lithium-ion secondary battery having the electrode and manufacturing methods thereof.

BACKGROUND OF THE INVENTION

A lithium-ion secondary battery which is a kind of a non-aqueous electrolyte secondary battery is a battery having a large charge and discharge capacity, and is used predominantly as batteries for electronic mobile devices. Further the number of lithium-ion secondary batteries used as a battery for electric vehicles is increasing, and improvement of performance is expected.

Some examples of active material for a positive electrode of a lithium-ion secondary battery that are generally used are those comprising a rare metal such as cobalt or nickel. However, an amount of rare metals available on the market is small, and rare metals are not always easy to obtain and in addition, are expensive. Therefore, active materials for a positive electrode using a material in place of rare metals are demanded. Further, in the case of oxide compound-based active materials for a positive electrode, oxygen in an active material for a positive electrode is released due to overcharging, and as a result, an organic electrolytic solution and a current collector are oxidized and burnt, thereby resulting in possible firing or explosion.

Under such a situation, recent attention has been paid to a technique using sulfur as an active material for a lithium-ion secondary battery. Sulfur is not only easily available and is inexpensive as compared with rare metals but also can increase a charge and discharge capacity of a lithium-ion secondary battery. For example, in a lithium-ion secondary battery using sulfur as an active material for a positive electrode, it is known that a charge and discharge capacity which is as large as about six times that of a lithium-ion secondary battery using lithium cobalt oxide which is a material generally used for a positive electrode can be achieved. Further, sulfur has an advantage such that a reactivity is lower as compared with oxygen and a risk of causing firing or explosion is low.

Furthermore, J P 2002-154815 A and JP 2015-092449 A disclose composite active materials comprising sulfur, carbon material and the like. By using such a carbon-sulfur composite active material, elution of sulfur into an electrolytic solution can be inhibited and cycle characteristic of a lithium-ion secondary battery can be improved.

SUMMARY OF THE INVENTION

An aluminum current collector using an aluminum (Al) foil or the like is very useful since it is inexpensive, its weight is light and an energy density of a battery can be improved as compared with other current collectors. However, when an aluminum foil is used as a current collector of an electrode and an aqueous electrode slurry comprising a sulfur-based active material is applied thereto, there is a problem such that the aluminum foil is oxidized and an insulating film is formed, thereby significantly decreasing a charge and discharge capacity of a secondary battery. Meanwhile, in the case of a non-aqueous electrode slurry comprising a sulfur-based active material, the above-mentioned problem can be solved, but in the case of many of sulfur-based active materials, if these materials are exposed to an organic solvent such as N-methyl-2-pyrrolidone (NMP), sulfur elutes into the solvent, thereby decreasing an electrode capacity and a bonding strength of a binder. Therefore, the present situation is such that in the case where an electrode slurry comprising a sulfur-based active material and an aqueous binder, it is difficult to use an aluminum foil being poor in acid resistance.

An object of the present invention is to provide a lithium-ion secondary battery having a large charge and discharge capacity and an excellent cycle characteristic irrespective of kind and shape of a current collector.

The present inventors have made intensive studies to solve the above-mentioned problem and as a result, have found that a lithium-ion secondary battery having a large charge and discharge capacity and an excellent cycle characteristic can be produced irrespective of kind and shape of a current collector by providing a primer layer for protecting a current collector and a crosslinking agent layer comprising a compound being capable of crosslinking an aqueous binder contained in the primer layer, between a current collector and an active material layer comprising a sulfur-based active material, and have completed the present invention.

Namely, the present invention relates to:

[1] an electrode comprising a current collector, an active material layer comprising a sulfur-based active material, a primer layer for protecting the current collector and a crosslinking agent layer comprising a compound being capable of crosslinking an aqueous binder contained in the primer layer, wherein the primer layer and the crosslinking agent layer are disposed between the current collector and the active material layer,

[2] the electrode according to the above [1], comprising the current collector, the primer layer comprising an electrically conductive additive and the aqueous binder, the crosslinking agent layer comprising, as a crosslinking agent, the compound being capable of crosslinking the aqueous binder contained in the primer layer, and the active material layer comprising the sulfur-based active material, an electrically conductive additive and an aqueous binder,

[3] the electrode according to the above [1] or [2], wherein the compound being capable of crosslinking the aqueous binder contained in the primer layer is one or more compounds selected from the group consisting of a zirconium compound, a titanium compound and a boron compound,

[4] the electrode according to any one of the above [1] to [3], wherein the crosslinking agent layer comprises one or more oxides selected from the group consisting of zirconium oxides and titanium oxides and a thickness of the crosslinking agent layer is from 1 nm to 5,000 nm,

[5] the electrode according to any one of the above [1] to [4], wherein the current collector is an aluminum current collector,

[6] the electrode according to any one of the above [1] to [5], wherein the sulfur-based active material is a carbon-sulfur composite active material,

[7] the electrode according to any one of the above [1] to [5], wherein the sulfur-based active material comprises a carbon-sulfur structure having peaks at around 500 $cm^{-1}$, 1250 $cm^{-1}$, and 1450 $cm^{-1}$, and 1,450 cm' of a Raman shift in a Raman spectrum,

[8] the electrode according to any one of the above [2] to [7], wherein the electrically conductive additive contained in the primer layer is a carbon-based electrically conductive additive,

[9] a lithium-ion secondary battery comprising a positive electrode, a negative electrode, an electrolyte and a separator disposed between the positive electrode and the negative electrode, wherein at least one of the positive electrode and the negative electrode is the electrode of any one of the above [1] to [8],

[10] A method of manufacturing the electrode of any one of the above [2] to [8], the method comprising: a step of forming a primer layer for protecting a current collector, a step of forming a crosslinking agent layer comprising a compound being capable of crosslinking an aqueous binder contained in the primer layer and a step of forming an active material layer comprising a sulfur-based active material, an electrically conductive additive and an aqueous binder,

[11] The method of the above [10], wherein the step of forming a crosslinking agent layer comprises a step of applying a crosslinking agent to a surface of the primer layer and a step of thermal decomposition of the crosslinking agent.

[12] A method of manufacturing a lithium-ion secondary battery comprising a step of manufacturing the lithium-ion secondary battery using the electrode obtained by the manufacturing method of the above [10] or [11].

[13] An electrical apparatus using the lithium-ion secondary battery of the above [9]. the method of the above [10], wherein the step of forming a crosslinking agent layer comprises a step of applying a crosslinking agent to a surface of the primer layer and a step of thermal decomposition of the crosslinking agent, and

[12] an electrical apparatus using the lithium-ion secondary battery of the above [9].

According to the configuration of the above [1], an electrode having a high capacity and an excellent cycle characteristic can be obtained. Here, the reason why the binder contained in the primer layer is an aqueous binder is that in the case of a non-aqueous binder, if a battery is exposed to a high temperature environment of 50° C. or higher, the primer layer absorbs an electrolytic solution and swells, thereby increasing a resistance of the battery. Further, since a solvent to be used for the primer layer is water, an influence on a human body and an environment can be made as small as possible.

According to the configuration of the above [2], even in the case of an electrode slurry comprising an aqueous binder, the slurry can be applied uniformly to the current collector. In the case of an electrode slurry comprising a non-aqueous binder, a hydrophilic primer layer is apt to repel a hydrophobic active material slurry and therefore, a uniform electrode is difficult to obtain. Further, in the case of an electrode slurry comprising an aqueous binder, a discharge capacity of a battery becomes larger as compared with an electrode slurry comprising a non-aqueous binder. When an organic solvent such as NMP is used as a solvent for an electrode slurry, there is a case where sulfur in the sulfur-based active material dissolves in the electrode slurry, which may decrease an electrode capacity remarkably. Further, high temperature durability is improved by using an aqueous binder in the same manner as in the above-mentioned primer layer.

According to the configuration of the above [3], even in the case of a small amount of a crosslinking agent or a thin crosslinking agent layer, the primer layer can be subjected to sufficient crosslinking, and even in the step of forming an active material layer using an aqueous binder, swelling of the primer layer does not occur. Therefore, there is an effect of improving an output characteristic of a battery. The crosslinking agent is an insulator, and therefore will be a factor of increasing an electrode resistance when being interposed between the current collector and the active material layer. However, when the crosslinking agent layer is formed using the crosslinking agent in as small an amount as possible or a thickness of the layer is made as thin as possible, electric conductivity is not impaired and output characteristic of a battery is improved by a tunnel effect of the active material layer and the primer layer.

According to the configuration of the above [4], oxides can inhibit decomposition of the electrolytic solution and an effect of improving cycle characteristic of a battery can be expected.

According to the configuration of the above [5], even by use of an aluminum current collector, an electrode having a high capacity and an excellent cycle characteristic can be obtained. Usually when the sulfur-based active material comes into contact with water, an electrode slurry exhibits acidity (a pH value decreases). If such an acid slurry is applied to an aluminum current collector, a chemical reaction is generated between the acid and the aluminum and an electrode capacity decreases remarkably. Therefore, if a material, which is hard to react with acid, such as stainless steel (SUS) or carbon is used as a current collector, no chemical reaction occurs between an acid and a current collector and a problem with decrease in an electrode capacity can be solved. However, these current collectors are low in electric conductivity as compared with an aluminum current collector, which will be a factor for causing decrease in output characteristic of a battery. Since a primer layer is present on an aluminum current collector, the aluminum current collector having excellent acid resistance can be obtained, and an electrode being excellent in electric conductivity can be obtained.

According to the configuration of the above [6], a discharge capacity decreases as compared with an electrode using pure sulfur as an active material, but an electrode exhibiting stable cycle characteristic can be obtained.

According to the configuration of the above [7], not less than 450 mAh/g and not more than 800 mAh/g of a reversible capacitance of the active material per unit weight can be exhibited and an electrode having excellent durability even under an environment of 50° C. or higher can be obtained.

According to the configuration of the above [8], an electrode having a light weight and excellent electric conductivity can be obtained.

According to the configuration of the above [9], a battery having a high capacity and excellent cycle characteristic and heat resistance can be obtained.

According to the manufacturing method of the above [10], either one of the electrodes described in the above [2] to [8] can be manufactured.

According to the manufacturing method of the above [11], an electrode giving a small internal resistance of a battery can be manufactured.

According to the present disclosure, it is possible to provide a lithium-ion secondary battery having a large charge and discharge capacity and an excellent cycle characteristic irrespective of kind and shape of a current collector.

DETAILED DESCRIPTION

The lithium-ion secondary battery according to the embodiments of the present invention is characterized in that the battery is provided with an electrode (preferably a positive electrode) comprising a current collector, an active material layer comprising a sulfur-based active material, a primer layer protecting the current collector and a crosslinking agent layer comprising, as a crosslinking agent, a compound being capable of crosslinking an aqueous binder contained in the primer layer, the both layers being disposed between the current collector and the active material layer. The configuration of the lithium-ion secondary battery according to the embodiments of the present invention is explained below. It is noted that a numerical range shown herein means that the numerical values at both ends are included within the numerical range.

The lithium-ion secondary battery comprises a positive electrode, a negative electrode, a separator, an electrolytic solution or an electrolyte and a battery container.

Each of electrodes such as a positive electrode and a negative electrode comprises an active material, an electrically-conductive additive, a binder and a current collector. Generally the electrodes can be obtained by mixing the active material, the electrically-conductive additive and the binder to water or an organic solvent to form the mixture into a slurry, applying the slurry to a surface of a current collector and then drying the slurry.

The binder is used to bond the active materials to each other, the active material to the current collector and the active material to the electrically conductive additive. The binder is roughly classified into an aqueous binder (also called a water type binder) prepared using water as a solvent and a non-aqueous binder (also called an organic solvent type binder, a non-water type binder or an oil-based binder) prepared using an organic solvent such as N-methyl-2-pyrrolidone (NMP).

The organic solvents including NMP are said to possibly have an adverse effect on the environment and is demanded to be collected when drying the electrode, which causes increase in an electrode manufacturing cost. Further, it is well-known that the organic solvent type binder is hard to use in a high temperature environment since it swells in a high temperature electrolytic solvent and increases an electrode resistance.

Herein, "cycle characteristic" means a characteristic of inhibiting a charge and discharge capacity from decreasing due to repeated charging and discharging. It can be said that a lithium-ion secondary battery exhibiting a small degree of decrease in a charge and discharge capacity and having a high capacity retention rate is excellent in cycle characteristic.

<Configuration of Electrode>

The electrode according to the embodiments of the present invention is characterized in that the primer layer protecting the current collector and the crosslinking agent layer comprising, as a crosslinking agent, a compound being capable of crosslinking an aqueous binder contained in the primer layer, are disposed between the current collector and the active material layer comprising a sulfur-based active material. The primer layer comprises, for example, an electrically conductive additive, a binder and the like. The active material layer comprises, for example, a sulfur-based active material, an electrically conductive additive, a binder and the like.

(Current Collector)

Current collectors which are used generally as an electrode for a lithium-ion secondary battery can be used as the current collector. Examples of a current collector include aluminum current collectors such as an aluminum foil, an aluminum mesh, a punched aluminum sheet and an expanded aluminum sheet; stainless steel current collectors such as a stainless steel foil, a stainless steel mesh, a punched stainless steel sheet and an expanded stainless steel sheet; nickel current collectors such as expanded nickel and a nonwoven nickel fabric; copper current collectors such as a copper foil, a copper mesh, a punched copper sheet and an expanded copper sheet; titanium current collectors such as a titanium foil and a titanium mesh; and carbon current collectors such as a nonwoven carbon fabric and a woven carbon fabric. Among these, aluminum current collectors are preferable from the viewpoint of a mechanical strength, conductivity, a mass density, cost and the like. Further, a current collector made of a nonwoven carbon fabric and/or a woven carbon fabric which comprises carbon having a high degree of graphitization is suitable as a current collector for a sulfur-based active material since no hydrogen is contained therein and reactivity with sulfur is low. Examples of a starting material for a carbon fiber having a high degree of graphitization include various pitches (namely, by-products such as petroleum, coal and coal tar), polyacrylonitrile fiber (PAN) and the like which are starting materials for a carbon fiber.

There is no particular restriction on a shape of the current collector, and for example, a foil substrate, a three-dimensional substrate and the like can be used. When the three-dimensional substrates (foamed metal, mesh, woven fabric, non-woven fabric, expanded metal, etc.) are used, even in the case of a binder lacking in adhesion to a current collector, there is a tendency that an electrode having a high capacity density can be obtained and in addition, a high efficiency charge and discharge characteristic can be obtained satisfactorily.

The current collector may have a plurality of through-holes having a rate of hole area of from 0.01% to 50%. The rate of hole area is preferably from 0.1% to 30%, more preferably from 0.5% to 25%.

(Primer Layer)

In the embodiments of the present invention, the primer layer protecting the current collector is present between the current collector and the active material layer, and therefore, the current collector is prevented from being oxidized and performance can be exhibited irrespective of kind of the current collector. For example, even in the case of a foil current collector, not only a capacity density can be increased but also electric polarization becomes small and a high efficiency charge and discharge characteristic becomes satisfactory even if charging and discharging are performed at a high electric current. For example, an aluminum foil is very useful since it is inexpensive and light in weight as compared with other current collectors and an energy density of a battery can be improved. It is noted that the primer layer can be expected to exhibit the similar effect in the case of being provided not only on a foil current collector but also on a current collector of a three-dimensional substrate.

The primer layer according to the embodiment of the present disclosure can be formed by mixing, for example, an electrically conductive additive, a binder and a solvent, kneading a mixture sufficiently to prepare a uniform slurry, and thereafter, applying the slurry to a current collector and drying it. Compounding amounts of the above-mentioned components are not limited particularly and for example, 10 to 100 parts by mass of the binder and a proper amount of the solvent can be compounded based on 100 parts by mass of the electrically conductive additive. A thickness of the primer layer is preferably 0.01 µm to 100 µm, more preferably 0.1 µm to 50 µm, further preferably 0.5 µm to 20 µm. It is noted that "the thickness" in the embodiment of the present disclosure is a value measured using a micrometer (Digimatic standard outside micrometer MDC-25SX manufactured by Mitsutoyo Corporation). A thickness of less than 1 µm is a value measured by cutting a target layer with a cross cutter and observing its cut cross-section with an SEM (scanning electron microscope).

Well-known electrically-conductive additives used on electrodes can be used as an electrically-conductive additive. Examples of the electrically-conductive additive include carbon-based electrically-conductive additives such as vapor grown carbon fibers (VGCF), carbon powders, carbon black (CB), acetylene black (AB), KETJENBLACK (KB), graphite, graphene and carbon tube; fine powders of metals being stable at positive-electrode potentials, such as aluminum and titanium and the like. One or more thereof can be used as the electrically-conductive additive. From the viewpoint of capacity density and input and output characteristic, carbon-based electrically-conductive additives are preferable, and further, from the viewpoint of conductivity and cost, acetylene black (AB) and KETJENBLACK (KB) are more preferable.

Well-known binders used on electrodes can be used as a binder, and aqueous binders can be used suitably from the viewpoint of reduction of a load on environment and a human body. Examples of the aqueous binder include hydroxypropyl cellulose (HPC), carboxymethyl cellulose (CMC), polyvinyl alcohol (PVA), acrylic resins, styrene-butadiene rubber (SBR), urethane and the like. These binders may be used alone or may be used in combination of a plurality thereof. Among these, from the viewpoint of a high crosslinking rate, HPC, CMC, PVA and acrylic resins are preferable.

Examples of the solvent include one or more of N-methyl-2-pyrrolidone (NMP), N,N-dimethylformaldehyde, alcohols, water and the like. From the viewpoint of reduction of a load on environment and a human body, water is preferable.

(Crosslinking Agent Layer)

In the embodiment of the present disclosure, it is preferable to use an aqueous binder for forming the primer layer. The reason therefor is inhibition of swelling of the primer layer in a high temperature electrolytic solution as mentioned above. However, since the primer layer is poor in water resistance, it is necessary to subject the primer layer to crosslinking so that the primer layer should not be dissolved in water. In the embodiment of the present disclosure, the crosslinking agent layer is provided between the primer layer and the active material layer, thereby crosslinking the aqueous binder of the primer layer so as not to be dissolved. Thus, it is possible to prevent the primer layer from being dissolved in water and being peeled off when a slurry comprising an active material prepared using an aqueous binder is further applied to the primer layer.

The crosslinking agent layer according to the embodiment of the present disclosure is produced, for example, by applying an aqueous solution or a suspension of the crosslinking agent to the primer layer and drying the aqueous solution or the suspension. It is preferable that at the time of drying, heat treatment is performed at a temperature of not lower than 60° C. and not higher than 300° C. for thermal decomposition of the crosslinking agent. The heat treating temperature is more preferably not lower than 80° C. and not higher than 200° C. An atmosphere for the heat treatment may be air, and it is preferable that in order to inhibit oxidation of the current collector and an active material, the heat treatment is conducted under an inert atmosphere. The inert atmosphere stands for, for example, vacuum, inert gas, nitrogen gas or the like, and may be a mixed gas environment. A heat treating time is not limited particularly as far as the crosslinking agent is subjected to thermal decomposition, and is usually from one hour to 100 hours.

The crosslinking agent is not limited particularly as far as it is a compound being capable of crosslinking an aqueous binder in the primer layer. Examples of the crosslinking agent include zirconium compounds such as zirconium chloride, zirconium fluoride, zirconium bromide, zirconium iodide, zirconium hydroxide, chloride zirconium hydroxide, oxide zirconium chloride, zirconium sulfate, zirconium nitrate, zirconium carbonate, ammonium zirconium carbonate, zirconium alkoxide, zirconium chelate, zirconium acylate and zirconium ammonium; titanium compounds such as titanium chloride, titanium fluoride, titanium bromide, titanium iodide, titanium alkoxide, titanium chelate, titanium acylate and titanium ammonium; boron compounds such as boric acid, boron oxide and boron fluoride; and the like. From the viewpoint of a crosslinking rate and improvement of battery characteristic, zirconium compounds are preferable, and halogenated zirconium such as zirconium chloride, zirconium fluoride, zirconium bromide and zirconium iodide are more preferable.

From the viewpoint of easy thermal decomposition, zirconium compounds such as zirconium chloride, zirconium fluoride, zirconium bromide, zirconium iodide, zirconium hydroxide, chloride zirconium hydroxide, oxidized zirconium chloride, ammonium zirconium carbonate, zirconium alkoxide, zirconium chelate, zirconium acylate and zirconium ammonium, and titanium compounds such as titanium chloride, titanium fluoride, titanium bromide, titanium iodide, titanium alkoxide, titanium chelate and titanium acylate are preferable. Such crosslinking agents are subject to thermal decomposition in a heat treating step to produce an oxide. It is noted that even halogenated zirconium and halogenated titanium are subject to hydrolysis by dissolution in water, and an oxide can be obtained by the following heat treatment. By applying the crosslinking agent to a surface of the primer layer and thereafter conducting heat treatment, an oxide is precipitated. In this case, in the electrode, an oxide layer (preferably an oxide layer comprising one or more selected from the group consisting of zirconium oxides and titanium oxides) resulting from decomposition of the crosslinking agent is interposed between the primer layer and the active material layer.

An amount of the crosslinking agent is usually 0.01 to 100% by mass, preferably 0.1 to 20% by mass, more preferably 0.5 to 10% by mass based on an amount of aqueous binder contained in the primer layer. When the amount of the crosslinking agent is less than 0.1% by mass, a crosslinking reaction does not advance sufficiently and when an electrode slurry prepared using an aqueous binder is applied, the primer layer is apt to peel. When the amount is more than 100% by mass, peeling of the primer layer can be prevented, but an electrode resistance is increased and an output characteristic of a battery decreases.

A thickness of the crosslinking agent layer is preferably 1 nm to 5,000 nm, more preferably 1 nm to 1,000 nm, further preferably 1 nm to 500 nm. When the thickness is less than 1 nm, a crosslinking reaction does not advance sufficiently and when an electrode slurry prepared using an aqueous binder is applied, the primer layer is apt to peel. When the thickness exceeds 5,000 nm, peeling of the primer layer can be prevented, but an electrode resistance is increased and an output characteristic of a battery decreases. Here, the thickness may be a thickness of only the oxide layer after decomposition of the crosslinking agent.

(Active material layer)

The active material layer according to embodiments of the present invention is formed by, for example, mixing an active material, an electrically conductive additive, a binder and a solvent, sufficiently kneading a mixture uniformly to prepare a slurry and thereafter applying the slurry onto the crosslinking agent layer and drying the slurry.

A sulfur-based active material is used suitably as an active material. It is noted that in the embodiment of the present disclosure, "a sulfur-based active material" means an active material comprising sulfur elements as component elements, and examples thereof include sulfur element-containing compounds such as elemental sulfur (S), titanium sulfide, molybdenum sulfide, iron sulfide, copper sulfide, nickel sulfide, lithium sulfide and organic disulfide compounds. Further, active materials (carbon-sulfur composite active materials) obtained by compounding sulfur and a carbon material can also be used suitably.

A carbon-sulfur structure having a thienoacene structure is used particularly suitably as a carbon-sulfur composite active material. A lithium-ion secondary battery using the carbon-sulfur structure on a positive electrode has a large charge and discharge capacity and is excellent in cycle characteristic.

The carbon-sulfur structure has peaks at around 500 cm$^{-1}$, 1250 cm$^{-1}$, and 1450 cm$^{-1}$ of a Raman shift in a Raman spectrum. These spectra differ from spectra called D band at around 1350 cm$^{-1}$ and G band at around 1590 cm$^{-1}$ which are seen in a graphite structure of 6-membered ring, and are analogous to thienoacene spectra described in the document (Chem. Phys. Chem., 2009, 10, 3069-3076). Therefore, it is presumed that the carbon-sulfur structure showing the above-mentioned Raman spectra has a thienoacene structure being in a form of a long chain polymer formed by condensation and linking of thiophene rings and represented by the following formula (i).

(i)

Further, it is preferable that a content of hydrogen of the carbon-sulfur structure is not more than 1.6% by mass, particularly not more than 1.0% by mass. Further, in FT-IR spectrum, it is preferable that the peaks are present at around 917 cm$^{-1}$, around 1042 cm$^{-1}$, around 1149 cm$^{-1}$, around 1214 cm$^{-1}$, around 1388 cm$^{-1}$, around 1415 cm$^{-1}$ and around 1439 cm$^{-1}$.

The carbon-sulfur structure can be prepared, for example, in accordance with the method described in JP 2015-092449 A by compounding sulfur and a vulcanization accelerator and/or a conductive powder to an unvulcanized diene rubber and heat-treating an obtained mixture. The prepared carbon-sulfur structure can be pulverized and classified to be formed into a particle size suitable for producing a positive electrode.

As a total amount of sulfur in the sulfur-based active material is larger, cycle characteristic of the lithium-ion secondary battery tends to be improved. Therefore, the total amount of sulfur in the sulfur-based active material by an elemental analysis is preferably 50% by mass or more.

In the case where the sulfur-based active material is a carbon-sulfur composite active material, an amount of sulfur incorporated into molecules of the carbon-sulfur structure may be smaller, a network being large enough for sealing elemental sulfur therein may not be formed and electric conductivity of electron may be decreased due to the sulfur-based active material. As a result, a charge and discharge capacity of the lithium-ion secondary battery may be smaller. Further, cycle characteristic may be lowered since elution of sulfur into an electrolytic solution cannot be inhibited sufficiently.

In a system where a carbon material having a graphite structure is compounded as an electrically conductive powder, there may be a case where the sulfur content is decreased below the above-mentioned range due to an influence of the carbon constituting the carbon material. However, an effect of improving cycle characteristic of the lithium-ion secondary battery can still be exhibited. In that case, the sulfur content is preferably 45% by mass or more in order to maintain the effect of improving cycle characteristic of the lithium-ion secondary battery.

An electrically conductive additive, a binder and a solvent which are similar to those used on the primer layer can be used as an electrically conductive additive, a binder and a solvent for the active material layer.

Compounding amounts of the above-mentioned components are not limited particularly and for example, 20 to 100 parts by mass of the electrically conductive additive, 10 to 20 parts by mass of the binder and a proper amount of the solvent can be compounded based on 100 parts by mass of the active material of the positive electrode.

(Negative Electrode Material)

Examples of a negative electrode material constituting the negative electrode of the lithium-ion secondary battery include known negative electrode materials, for example, metallic lithium, carbon-based materials such as graphite, silicon-based materials such as a silicon thin film and SiO, tin-alloy-based materials such as copper-tin or cobalt-tin and the like. Among the above-mentioned negative electrode materials, especially in the case where a carbon-based material, a silicon-based material, a tin alloy-based material or the like that does not include lithium is used as a negative electrode material, short-circuiting between positive and negative electrodes, which results from production of dendrite, is less likely to arise, and a long service life of the lithium-ion secondary battery can be achieved. Among these, a silicon-based material which is a high capacity negative electrode material is preferable, and particularly a silicon thin film is more preferable since an electrode thickness can be made smaller, which is advantageous from the viewpoint of a capacity per a unit volume.

However, in the case where a negative electrode material comprising no lithium is used in combination with a positive electrode according to embodiments of the present invention, both of the positive electrode and the negative electrode result in comprising no lithium, and therefore, a pre-doping treatment for incorporating lithium in either one or both of the positive electrode and the negative electrode will be required.

A well-known method can be used as a pre-doping method. For example, in the case where the negative electrode is doped with lithium, there are an electrolytic doping method for electrochemical lithium doping by setting a half cell using metal lithium as a counter electrode, a pre-doping method of allowing an electrode, to which a metal lithium foil is attached, to be left to stand in an electrolytic solution, thereby doping the electrode with lithium by diffusion of lithium, and the like method. It is noted that the above-mentioned electrolytic doping method can be used for pre-doping of a positive electrode with lithium.

<Electrolyte>

An electrolyte constituting the lithium-ion secondary battery may be a liquid or a solid having ion conductivity, and those analogous to a known electrolyte to be used on a lithium-ion secondary battery can be used. From the viewpoint of high output characteristic of the battery, it is preferable to use those obtained by dissolving an alkali-metal salt serving as a supporting electrolyte in an organic solvent.

Examples of an organic solvent include at least one selected from nonaqueous solvents, such as ethylene carbonate, propylene carbonate, dimethyl carbonate, diethyl carbonate, ethyl methyl carbonate, dimethyl ether, γ-butyrolactone and acetonitrile. Preferred is ethylene carbonate, propylene carbonate or a mixture thereof.

Examples of the supporting electrolyte include $LiPF_6$, $LiBF_4$, $LiAsF_6$, $LiCF_3SO_3$, $LiI$, $LiClO_4$ and the like, and $LiPF_6$ is preferable.

A concentration of the supporting electrolyte can be from about 0.5 mol/liter to 1.7 mol/liter. It is noted that the electrolyte is not limited to a liquid form. For example, in the case where the lithium-ion secondary battery is a lithium polymer secondary battery, the electrolyte may be a solid form (for example, a form of polymer gel) or an ionic liquid or a molten salt.

<Separator>

The separator intervenes between the positive electrode and the negative electrode, thereby not only allowing the movements of ions between the positive electrode and the negative electrode but also functioning to prevent the positive electrode and the negative electrode from internally short-circuiting one another. When the lithium-ion secondary battery is a hermetically-closed, a function of retaining the electrolytic solution is required for the separator.

As for a separator, it is preferable to use a thin-thickness and microporous or nonwoven-shaped film that is made of a material, such as polyethylene, polypropylene, polyacrylonitrile, aramid, polyimide, cellulose, glass and the like.

A diameter of separator hole is preferably 1 μm to 1,000 μm, more preferably 10 μm to 500 μm, further preferably 10 μm to 200 μm.

A thickness of the separator is preferably 1 μm to 100 μm, more preferably 5 μm to 50 μm, further preferably 10 μm to 40 μm.

A percentage of voids of the separator is preferably 10 to 90%, more preferably 30 to 85%, further preferably 50 to 80%.

A diameter of a separator fiber is preferably 0.001 μm to 100 μm, more preferably 0.01 μm to 20 μm, further preferably 0.1 μm to 10 μm.

The shape of the lithium-ion secondary battery according to the embodiment of the present disclosure is not limited particularly, and can be in various shapes such as cylindrical types, laminated types, coin types, button types and the like.

<Application of Secondary Battery>

The lithium-ion secondary battery provided with the electrode according to the embodiment of the present disclosure has a high capacity and is excellent in cycle characteristic, and therefore, can be used as power sources for electrical apparatuses such as a smart phone, power tools, vehicles and UPS.

EXAMPLE

The modes for carrying out the present invention are explained below. The present invention is explained by means of Examples, but is not limited to the Examples.

Example 1

<Preparation of Sulfur-Based Active Material>
(Preparation of Starting Compound)

A high-cis butadiene rubber (UBEPOL (registered trademark) BR150L manufactured by Ube Industries, Ltd., cis-1,4 bond content: 98% by mass) was used as an unvulcanized diene rubber; Denka Black manufactured by Denka Company Limited was used as an electrically conductive carbon material; precipitated sulfur manufactured by Tsurumi Chemical Industry Co., Ltd. was used as sulfur; and zinc diethyldithiocarbamate (NOCCELAR (registered trademark) EZ manufactured by OUCHI SHINKO CHEMICAL INDUSTRY CO., LTD.) was used as a vulcanization accelerator.

A starting compound was prepared by compounding 1,000 parts by mass of precipitated sulfur, 20 parts by mass of electrically conductive carbon material and 25 parts by mass of a vulcanization accelerator to 100 parts by mass of the above-mentioned high-cis butadiene rubber and kneading an obtained mixture with a test kneader (MIX-LABO manufactured by Moriyama Company Ltd.). The obtained starting compound was finely pulverized with a cutter mill and was subjected to heat-treating (Starting Compound 2).

(Reaction Apparatus)

Figure 1:
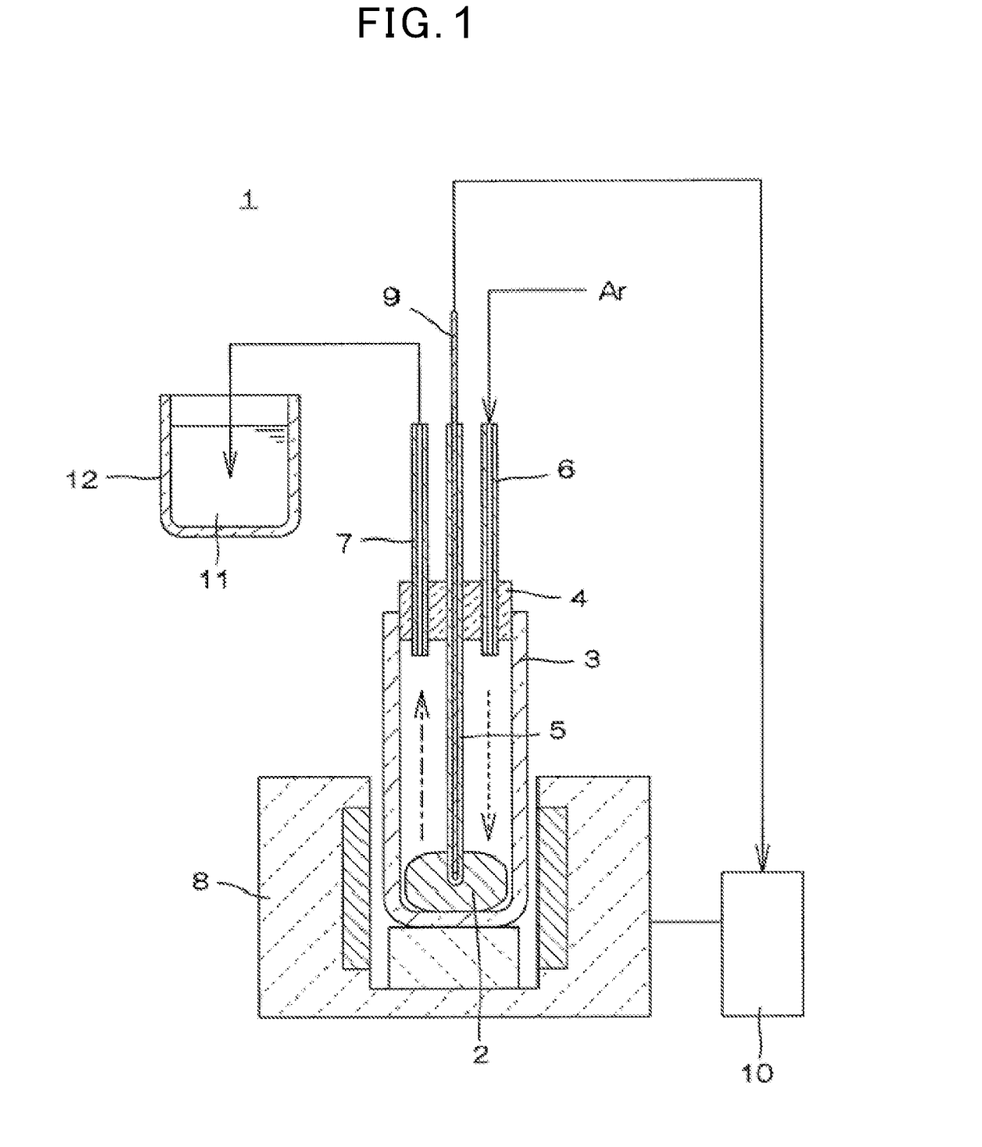
FIG. 1 is a sectional view schematically illustrating a reaction apparatus used for production of a sulfur-based active material.

A reaction apparatus 1 as illustrated in FIG. 1 was used for heat treatment of the starting compound 2. The reaction apparatus 1 comprises a reaction container 3, which has an outer diameter of 60 mm, an inner diameter of 50 mm and a height of 300 mm and is made of quartz glass, that is formed as a bottomed cylindrical shape to contain and heat-treat the starting compound 2; a silicone plug 4 for closing an upper opening of the reaction container 3; one alumina protection tube 5 ("Alumina SSA-S" available from NIKKATO CORPORATION, an outer diameter of 4 mm, an inner diameter of 2 mm and a length of 250 mm) and two tubes, which are a gas introducing tube 6 and a gas exhausting tube 7 (both are "Alumina SSA-S" available from NIKKATO CORPORATION, an outer diameter of 6 mm, an inner diameter of 4 mm and a length of 150 mm), these three tubes penetrating through the plug 4; and an electric furnace 8 (crucible furnace, a diameter of an opening: 80 mm, heating height: 100 mm) for heating the reaction container 3 from the bottom side.

The alumina protection tube 5 is formed in such a length that the lower part below plug 4 reaches the starting compound 2 contained in the bottom of the reaction container 3 and a thermocouple 9 is inserted through the inside of the alumina protection tube 5. The alumina protection tube 5 is used as a protective tube for the thermocouple 9. The leading end of the thermocouple 9 is inserted into the starting compound 2 while being protected by the closed leading end of the alumina protection tube 5 and functions to measure a temperature of the starting compound 2. Output of the thermocouple 9 is input in a temperature controller 10 of the electric furnace 8 as shown by the solid arrow in the drawing and the temperature controller 10 functions to control a heating temperature of the electric furnace 8 based on the input from the thermocouple 9.

The gas introducing tube 6 and the gas exhausting tube 7 are formed such that the bottom ends thereof project in 3 mm downwardly from the plug 4. Also, the upper part of the reaction container 3 projects from the electric furnace 8 to be exposed to atmosphere. Therefore, steam of sulfur generating from the starting compound due to heating of the reaction container 3 is raised to the upper part of the reaction container 3 as shown by the long dashed short dashed line arrow in the drawing, and transformed to a liquid drop while being cooled to be dropped and refluxed as shown by the broken line arrow in the drawing. Consequently, sulfur in the reaction system does not leak to the outside through the gas exhausting tube 7.

The gas introducing tube 6 is continuously supplied with argon gas from a gas supply system which is not shown. The gas exhausting tube 7 is connected to a trapping bath 12 containing an aqueous solution 11 of sodium hydroxide. The exhaust gas moving toward the outside through the gas exhausting tube 7 from the reaction container 3 is released to the outside after passing through the aqueous solution 11 of sodium hydroxide in the trapping bath 12. Therefore, even if hydrogen sulfide gas generated from a vulcanization reaction is contained in the exhaust gas, the hydrogen sulfide gas is removed therefrom by being neutralized with the aqueous solution of sodium hydroxide.

(Heat Treatment)

Heating with the electric furnace 8 was started 30 minutes after starting a continuous supply of argon gas to the reaction container 3 holding the starting compound 2 in its bottom at a flow rate of 80 ml/min from the gas supply system. The temperature elevation rate was 150° C./hr When the temperature of the starting compound reached 450° C., heat treatment was conducted for two hours while maintaining the temperature of 450° C. Then, the starting compound 2 was cooled naturally under an argon gas atmosphere to 25° C. while adjusting the flow rate of the argon gas and a reaction product was taken out of the reaction container 3.

(Removal of Unreacted Sulfur)

The reaction product was pulverized in a mortar and 2 g of a pulverized product was put in a glass tube oven and heated for three hours at 250° C. while vacuum suction was conducted to produce a sulfur-based active material in which unreacted sulfur was removed (or only a trace amount of unreacted sulfur was contained). The temperature elevation rate was 10° C./min.

(Raman Spectrum Analysis)

Figure 2:
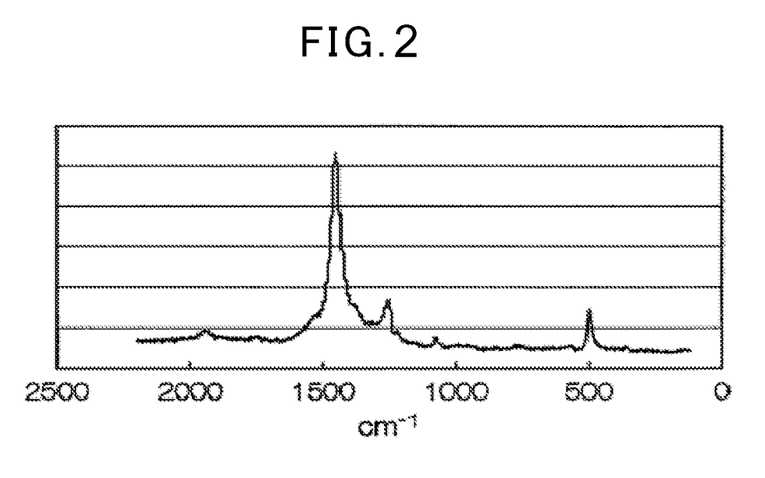
FIG. 2 is a graph showing a result of a Raman spectrum analysis of a sulfur-based active material obtained in Example 1.

The obtained sulfur-based active material was subjected to Raman spectrum analysis with a laser Raman microscope RAMAN-11 available from Nanophoton Corporation under the conditions of an excitation wavelength λ=532 nm, a grating of 600 gr/mm, and a resolution of 2 cm$^{-1}$ (FIG. 2). It is noted that in FIG. 2, an ordinate axis shows a relative strength, and an abscissa axis shows a Raman shift (cm$^{-1}$). The obtained sulfur-based active material has peaks at around 500 cm$^{-1}$, 1250 cm$^{-1}$, 1450 cm$^{-1}$ and 1940 cm$^{-1}$ of Raman shift, and it was confirmed that these results coincide well with the results of elemental analysis showing that a lot of sulfur was introduced and a hydrogen amount was reduced.

While these spectra of FIG. 2 differ from spectra called D band around 1350 cm$^{-1}$ and G band around 1590 cm$^{-1}$ which are seen in a graphite structure of 6-membered ring and are analogous to thienoacene spectra described in the document (Chem. Phys. Chem., 2009, 10, 3069-3076), it is presumed that the obtained sulfur-based active material has the thienoacene structure represented by the above-mentioned formula (i).

(FT-IR Spectrum Analysis)

Figure 3:
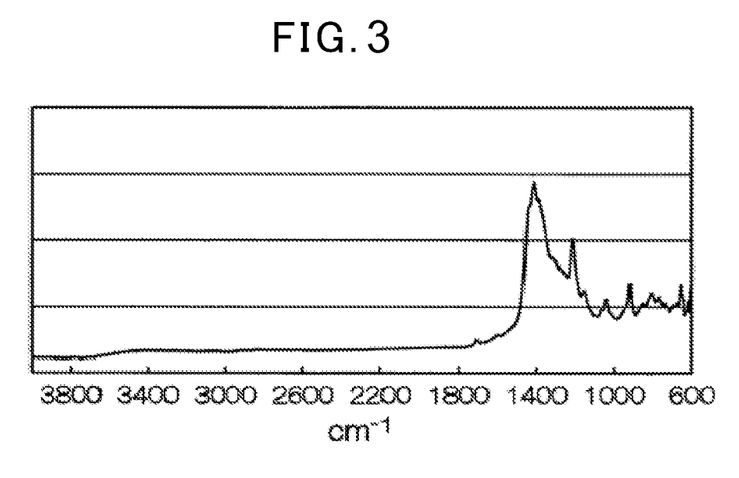
FIG. 3 is a graph showing a result of an FT-IR spectrum analysis of a sulfur-based active material obtained in Example 1.

The obtained sulfur-based active material was subjected to FT-IR spectrum analysis by a diffused reflection method under the conditions of a resolution: 4 cm$^{-1}$, the number of accumulations: 100 times and a measuring range: 400 to 4000 cm$^{-1}$ using a Fourier transform infrared spectrophotometer IR Affinity-1 available from Shimadzu Corporation (FIG. 3). In FT-IR spectrum of the obtained sulfur-based active material, the peaks are present at around 917 cm$^{-1}$, around 1042 cm$^{-1}$, around 1149 cm$^{-1}$, around 1214 cm$^{-1}$, around 1388 cm$^{-1}$, around 1415 cm$^{-1}$ and around 1439 cm$^{-1}$, and it was confirmed that these results coincide well with the results of elemental analysis showing that a lot of sulfur was introduced and a hydrogen amount was reduced.

<Production of Lithium-Ion Secondary Battery>

(Positive Electrode)

The acetylene black (Denka Black available from Denka Company Limited) and PVA (polyvinyl alcohol (available from Tokyo Chemical Industry Co., Ltd.)) were measured so that the compounding ratio thereof became the acetylene black:the PVA=8:2 (% by mass), and were put into a container. While adjusting a viscosity of the mixture using water as a dispersant, the mixture was subjected to stirring and mixing with a rotation/revolution mixer (ARE-250 available from Thinky Corporation) to prepare a uniform slurry. The prepared slurry was applied onto a 20 μm thick aluminum foil with an applicator, followed by 3-hour drying at 80° C. Thus, a 3.5 μm thick primer layer was formed.

One percent by mass aqueous solution of zirconium chloride (available from SIGMA-ALDRICH JAPAN) was applied onto the primer layer with a wire coater so that the amount of zirconium chloride becomes 1% by mass based on the amount of the aqueous binder, followed by 3-hour drying at 80° C. to form a crosslinking agent layer. A thickness of the crosslinking agent layer was 200 nm.

The above-mentioned sulfur-based active material, acetylene black and an aqueous acrylic resin were measured so that the compounding ratio thereof became the active material:the acetylene black:the acrylic resin=94:3:3 (% by mass), and were put into a container. While adjusting a viscosity of the mixture using water as a dispersant, the mixture was subjected to stirring and mixing with a rotation/revolution mixer (ARE-250 available from Thinky Corporation) to prepare a uniform slurry. The prepared slurry was applied onto the crosslinking agent layer with an applicator, followed by 3-hour drying at 150° C. and thermally decomposing the crosslinking agent layer to form a dehydrated and oxidized zirconium. Thus, a positive electrode (test electrode) for a lithium-ion secondary battery was produced.

(Negative Electrode)

A metallic lithium foil (a disk shape having a diameter of 14 mm and a thickness of 500 μm manufactured by Honjo Metal Co., Ltd.) was used as a negative electrode (counter electrode).

(Electrolytic Solution)

A non-aqueous electrolyte prepared by dissolving lithium hexafluorophophate (LiPF$_6$) at a concentration of 1.0 mol/liter in a solvent mixture obtained by mixing ethylene carbonate (EC) and diethyl carbonate (DEC) in a volume ratio of 1:1 was used as an electrolytic solution.

(Lithium-Ion Secondary Battery)

A non-woven glass filter (GA100 manufactured by ADVANTEC CO., LTD. and having a thickness of 440 μm) was sandwiched between the positive electrode and the negative electrode in a dry room to prepare an electrode-assembly battery. This electrode-assembly battery was accommodated in a battery case (e.g., a member for CR2032-type coin battery, a product of Hohsen Corp.) made of a stainless-steel container and the electrolyte solution was poured into the battery case. After that, the battery case was sealed hermetically with a crimping machine, thereby obtaining a lithium-ion secondary battery of Example 1.

constant-current charging and discharging were conducted at a current density of 0.2 mA/cm² under a condition of a test temperature of 30° C. It is noted that an end-of-discharge voltage was 1.0 V, and an end-of charge voltage was 3.0 V. Further, charging and discharging were repeated, and a discharge capacity (mAh/g) of each charging and discharging was measured. An active material capacity is a capacity per unit mass of the active material and is a value obtained from the following equation.

Active material capacity=Electrode capacity/{(Mass of electrode−Mass of current collector)×Mass ratio of active material}

The results are shown in Table 1.

TABLE 1

|  | Example | | | | Comparative Example | |
| --- | --- | --- | --- | --- | --- | --- |
|  | 1 | 2 | 3 | 4 | 1 | 2 |
| Current collector | Aluminum foil | Aluminum foil | Aluminum foil | SUS foil | Aluminum foil | Aluminum foil |
| Primer layer | present | present | present | present | Nil | present |
| Crosslinking agent layer | present | present | present | present | Nil | Nil |
| Discharge capacity (mAh/g) | | | | | | |
| 1st discharging | 1065 | 1066 | 1063 | 1070 | 374 | — (unable to produce an electrode) |
| 2nd discharging | 763 | 740 | 734 | 781 | 12 | — |
| 10th discharging | 595 | 576 | 580 | 601 | 9 | — |

Example 2

A battery was prepared in the same manner as in Example 1 except that a binder of a primer layer was changed from PVA to an acrylic resin and a thickness of the primer layer was changed to 4.0 μm.

Example 3

A battery was prepared in the same manner as in Example 1 except that a binder of a primer layer was changed from PVA to CMC and a thickness of the primer layer was changed to 2.0 μm.

Example 4

A battery was prepared in the same manner as in Example 1 except that a current collector was changed from the aluminum foil to a stainless steel (SUS) foil.

Comparative Example 1

A battery was prepared in the same manner as in Example 1 except that steps of forming a primer layer and a crosslinking agent layer were not conducted.

Comparative Example 2

A battery was prepared in the same manner as in Example 1 except that a step of forming a crosslinking agent layer was not conducted.

«Measurement of Discharge Capacity»

For the coin type lithium-ion secondary batteries prepared in the respective Examples and Comparative Examples, The lithium-ion secondary batteries according to the present invention exhibited a high discharge capacity and satisfactory cycle characteristics. In the case where the electrode has neither a primer layer nor a crosslinking agent layer, a sufficient discharge capacity and cycle characteristics could not be obtained (Comparative Example 1). In Comparative Example 2, when an electrode slurry is applied, a primer layer swelled, and at the time of drying of the electrode, the primer layer peeled from the current collector, and therefore, an electrode for evaluation could not be prepared. It was shown that when the electrode has the primer layer, it is important for the electrode to further have the crosslinking agent layer.

INDUSTRIAL APPLICABILITY

The lithium-ion secondary battery of the present disclosure is large in a charge and discharge capacity and excellent in cycle characteristics irrespective of kind and shape of a current collector.

The invention claimed is:

1. An electrode comprising
   a current collector layer;
   a primer layer comprising an aqueous binder and an electrically conductive additive, wherein the primer layer is disposed on the current collector layer for protection against oxidation;
   a crosslinking agent layer disposed between the primer layer and an active material layer, wherein the crosslinking agent layer comprises an oxide layer of zirconium oxide, titanium oxide or boron oxide resulting from thermal decomposition of one or more compounds selected from the group comprising a zirconium compound, a titanium compound and a boron compound, with the exclusion of zirconium ammonium carbonate, and has a thickness of 1 nm to 5,000 nm; and the active material layer comprising a sulfur-based active material, an electrically conductive additive and an aqueous binder, wherein the active material layer is disposed on the crosslinking agent layer, wherein the sulfur-based active material comprises a compound selected from elemental sulfur, titanium sulfide, molybdenum sulfide, iron sulfide, copper sulfide, lithium sulfide, nickel sulfide, an organic disulfide, and a compound having a carbon-sulfur structure.

2. The electrode of claim 1, wherein the crosslinking agent layer comprises one or more oxides selected from the group consisting of zirconium oxides and titanium oxides.

3. The electrode of claim 1, wherein the current collector is an aluminum current collector.

4. The electrode of claim 1, wherein the sulfur-based active material is a carbon-sulfur composite active material.

5. The electrode of claim 1, wherein the sulfur-based active material comprises a carbon-sulfur structure having peaks at around 500 $cm^{-1}$, 1250 $cm^{-1}$, and 1450 $cm^{-1}$ of a Raman shift in a Raman spectrum.

6. The electrode of claim 1, wherein the electrically conductive additive contained in the primer layer is a carbon-based electrically conductive additive.

7. A lithium-ion secondary battery comprising a positive electrode, a negative electrode, an electrolyte and a separator disposed between the positive electrode and the negative electrode, wherein at least one of the positive electrode and the negative electrode is the electrode of claim 1.

8. The electrode of claim 1, wherein the sulfur-based active material comprises a carbon-sulfur structure having a thienoacene structure.

9. The electrode of claim 1, wherein the electrode is a positive electrode.

10. An electrical apparatus using the lithium ion secondary battery of claim 9.

11. The electrode of claim 1, wherein the sulfur-based active material has a sulfur content of 45% by mass or more.

12. The electrode of claim 1, wherein the sulfur-based active material has a sulfur content of 50% by mass or more.

* * * * *